April 14, 1925.  1,533,426
J. JUNGFERMAN
CORN PLANTER ATTACHMENT
Filed Sept. 10, 1923  2 Sheets-Sheet 1
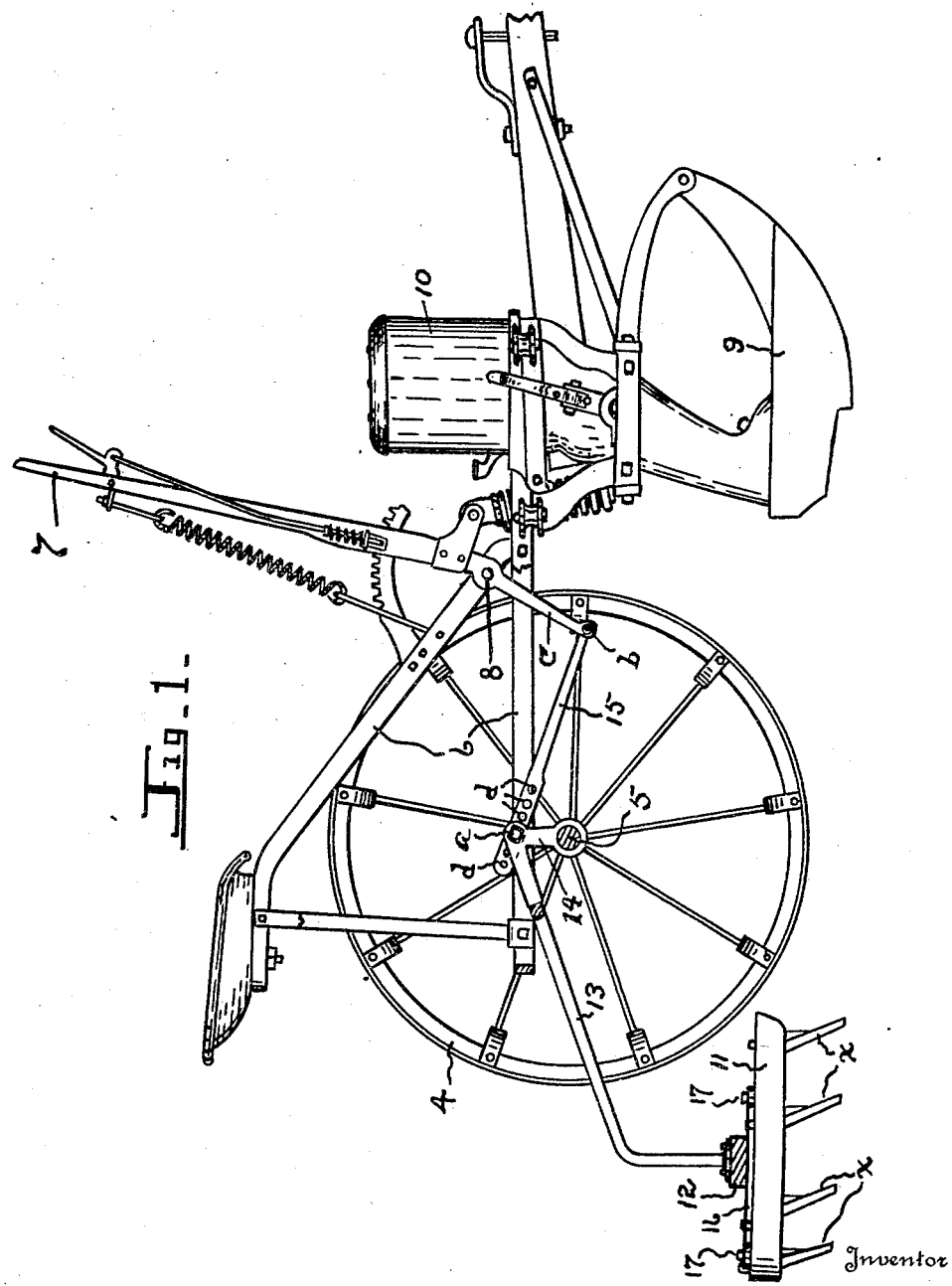
Inventor
Joseph Jungferman,
By Hiram A. Sturges,
Attorney

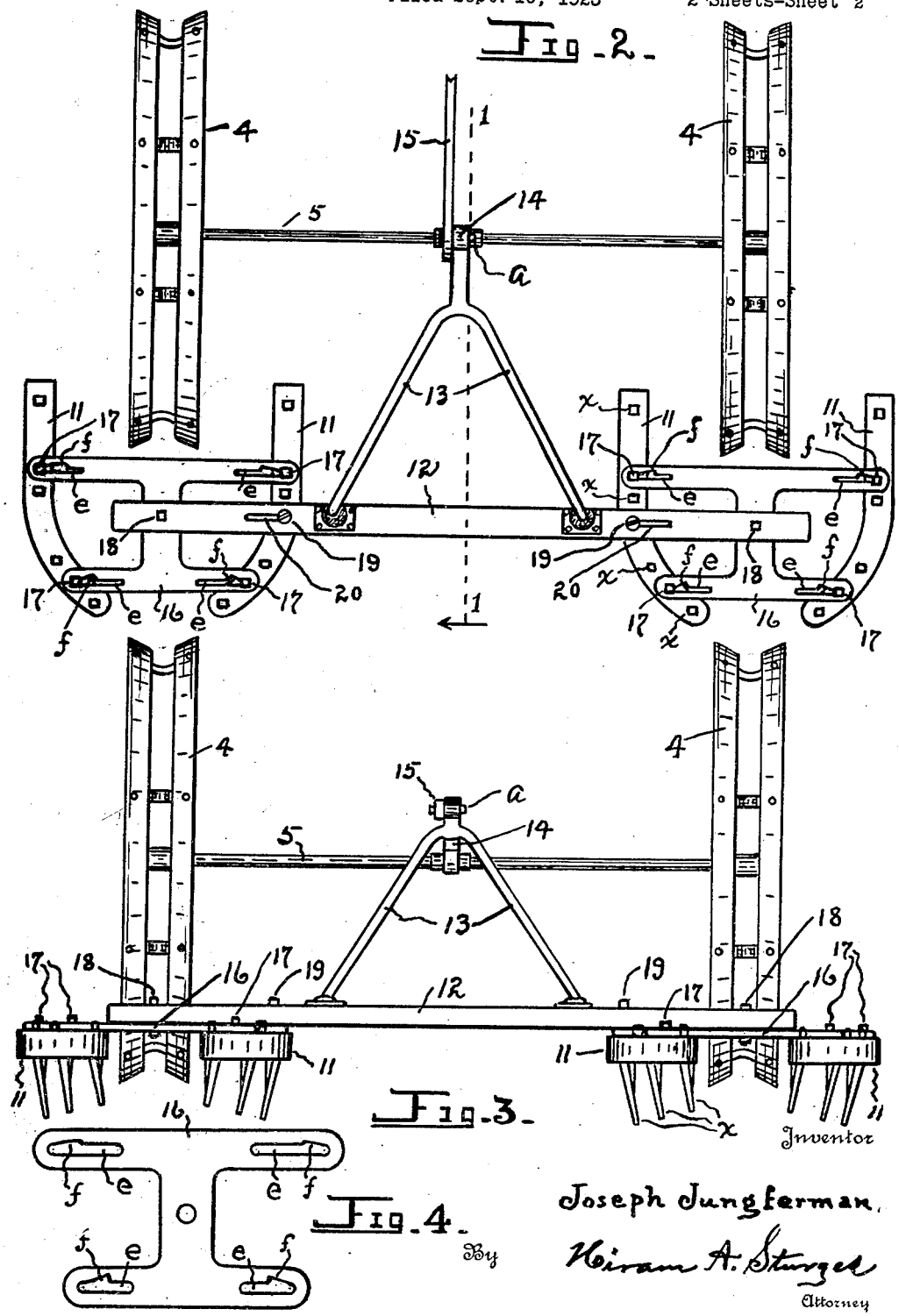

Patented Apr. 14, 1925.

1,533,426

UNITED STATES PATENT OFFICE.

JOSEPH JUNGFERMAN, OF NEOLA, IOWA, ASSIGNOR TO PAUL T. HAZEN, OF AVOCA, IOWA, AND ROY C. FELL, OF PERRY, IOWA.

CORN-PLANTER ATTACHMENT.

Application filed September 10, 1923. Serial No. 661,869.

*To all whom it may concern:*

Be it known that I, JOSEPH JUNGFERMAN, a citizen of the United States, residing at Neola, in the county of Pottawattamie and State of Iowa, have invented certain new and useful Improvements in a Corn-Planter Attachment, of which the following is a specification.

This invention relates to an attachment for corn planters of that class adapted to automatically plant corn in rows by a driven vehicle, the wheels of the vehicle generally being arranged to move in line with the rows, upon and rearwardly of the planted seeds. The invention has, for one of its objects to provide earth-engaging members or toothed shoes, so arranged that they operate automatically for filling the grooves caused by pressure of the wheels in the planted rows, so that water from excessive rains will not thereafter wash out the planted corn. Another object is to provide means to automatically form channels at the sides of the planted rows of corn while the planter is moving forwardly, said channels being useful for conserving, near the corn thus planted, any moisture or water deposited therein by rain, to facilitate growth of the corn; said channels also being of great advantage in instances where the ground is hilly, rough or inclined, since water occasioned by heavy rains may flow between the rows, and disturbance of the planted corn from erosion, being prevented.

Still another object is to provide such a construction that the earth-engaging members or shoes may be elevated by the hand-lever used for elevating the runners and seed-boxes when "turning about" at the end of a field, this being a matter of convenience in operation; and the invention includes means for adjusting the parts so that the teeth of the shoes may engage in the ground at selected depths, depending upon the condition of the ground, whether hard or soft and whether hilly or approximately level, the shoes also being adapted to be adjusted so that the channels may be disposed nearer to or further from the rows of corn, as may be desired, and may be so adjusted that wide or narrow channels may be formed.

With the foregoing objects in view the invention presents a novel and useful construction, combination and arrangement of parts as described herein and claimed, and as illustrated in the accompanying drawings, wherein,—

Fig. 1 is a view in side elevation, showing the attachment applied to a corn planter, the cross-bar for the shoes and vehicle axle being in section on line 1—1 of Fig. 2. Fig. 2 is a plan view showing the earth-engaging members or shoes and their connection with the axle. Fig. 3 is a rear view of the parts shown in Fig. 2. Fig. 4 is a plan view of a spacing-plate.

Referring now to the drawing for a more particular description, the invention is shown and described in connection with an ordinary planter adapted to be moved or driven through a field for planting rows of corn, said planter being provided with wheels 4 mounted upon an axle 5, and having a frame 6, a hand-lever 7 being pivotally mounted, as indicated at 8 upon a part of the frame, the parts of the planter being so arranged that a rearward movement of the hand-lever will cause an upward movement of the runners 9 together with the seed-boxes 10 and front parts of the planter to permit "turning about" at the end of a field or when driving from one field to another, and when the hand-lever is swung forwardly the front part of the planter will move downwardly, the runners engaging in the ground.

The several parts of corn planters are so well known that a full description is not needed for explaining the present invention, it being understood that while the planter moves forwardly the kernels of corn, for each hill, by operation of certain mechanism, are planted beneath the pair of runners, each runner being disposed in line with and at the front of a wheel 4, the result in operation being that the corn rows may be formed approximately parallel, and each wheel, during the forward movement of the planter, will move upon and over the same ground that was engaged by a runner at the front thereof, and will press the parts of the ground in which the kernels for the rows have been planted.

However, since the ground is generally loose and soft, grooves are formed by the wheels, and this is an objectionable feature, especially upon inclines, since as above stated, resulting erosion from rains tends to uncover the planted corn, so that replanting is often required.

In order that the objects first mentioned may be attained I provide a pair of earth-engaging elements, each consisting of a pair of shoe-members 11 disposed rearwardly of a wheel 4 and connected by a cross-bar 12, said bar being provided with a forwardly projecting tongue 13 having an arm 14 journalled on the axle, and by means of a link 15 pivotally mounted at its rear end, as indicated at $a$ upon the arm 14, and pivotally mounted at its front end, as indicated at $b$, upon the extension $c$ of the hand-lever, the shoes will be moved by movements of said lever 7,—that is to say, when the lever 7 is swung rearwardly for elevating the runners 9, the shoes will be elevated, and when said lever is moved forwardly, the runners and shoes will enter the ground.

The link is provided at longitudinal intervals with apertures $d$ for receiving the bolt or pivot-pin $a$, and on account of this construction the movement of the shoes may be adjusted so that the teeth $x$ may enter the ground to greater or lesser depths, as may be desired, the ridges being higher on the corn rows and the channels at the sides of the rows being deeper, of course, if the distance between the pivotal mountings $a$ and $b$ is increased, the arc of movement of the hand-lever remaining the same; and if it is desired to form channels of lesser depth, an adjustment may be readily made, the distance between the pivotal mountings for the link at $a$ and $b$ being decreased.

In order that the shoe-members of each pair may be adjusted so that they may be disposed nearer to each other or farther apart, and that their transverse inclination may be changed whenever desired, spacing-plates 16 are employed, each preferably being of H-shape, their parallel arms being provided with slots $e$, and by means of bolts 17 which traverse the slots and engage in members 11 the distance apart for the members 11 of each pair, may be provided, this being an important feature in the formation of the channels, for, if deep channels are to be formed it is an advantage that they be disposed at greater distances from the sides of a row.

Means are provided for adjusting the shoe-members so that the channels may be narrow or broad, this feature being of great advantage. For instance, if the ground is in a hardened condition and an adjustment has been made to prevent the teeth from entering the ground only a limited distance, the shoe-members should be adjusted to form, comparatively, broad channels; and if the ground has not been sufficiently pulverized, and is "lumpy," it would be best to form narrow channels at the sides of the rows. The adjustments to form broad or narrow channels may be readily made since each slot $e$ is provided with a recess $f$ opening thereon for receiving a bolt which permits the shoe-members to be adjusted transversely of the spacing-plate.

In operation, the shoe-members of each pair will not become obstructed by accumulations of weeds or "trash," for the reason that, while they are connected by the plate 16, they are disposed in spaced relation.

It will be noted that the arms of the spacing-plate will be maintained parallel with the cross-bar 12 by means of bolts 18 carried by said bar and which engage in each spacing-plate at the medial line thereof, the bolts 19 traversing the slots 20 of the bar and engaging one of the shoe-members of each pair, this arrangement operating to prevent any transverse swinging movements of the shoe-members independently of said bar 12.

Among some of the advantages to be derived by use of the invention, it may be stated that the attachment, as described, requires no attention of an operator, adjustments may be conveniently made corresponding to the condition of the ground, and since it consists of few and simple parts it may be economically manufactured.

While I have described construction in detail, I do not wish to be understood as limiting myself in this respect, and changes in form, size, proportion and minor details may be made, said changes being determined by the scope of the invention as claimed.

I claim as my invention,—

1. In an attachment for a corn-planter provided with wheels and an axle, a tongue having journalled bearings and extending rearwardly of the axle, a cross-bar rigid with the tongue, a plurality of shoes each having teeth disposed in non-alignment, a pair of spacing-plates each having a pair of connected, approximately parallel arms provided with slots and pivotally connected midway between said arms with the cross-bar, keepers traversing the shoes forwardly of the cross-bar engaging in the slots of the spacing-plates, keepers traversing the shoes rearwardly of the cross-bar engaging in the slots of the spacing-plates to permit transverse adjustments of said shoes relative to the spacing-plates, and means for maintaining the arms of the spacing-plates approximately parallel with the cross-bar.

2. In an attachment for a corn planter having wheels and an axle, a tongue journalled on the axle, a cross-bar rigid with the tongue rearwardly of said wheels, a pair of spacing-plates each being provided with slots and mounted on an end-portion of a cross-bar, a plurality of shoes provided with teeth and arranged in pairs, keepers in the slots of the spacing-plates engaging the shoes for a removable mounting of said shoes on said plates and to permit adjustments of each shoe of a pair longitudinally or transversely of a spacing-plate, and keepers traversing the cross-bar and engaging the shoes for preventing swinging movements of the spacing-plates and shoes relative to said cross-bar.

In testimony whereof, I have affixed my signature in presence of two witnesses.

JOSEPH JUNGFERMAN.

Witnesses:
J. S. HERMSEN,
J. M. SHOFF.